(12) United States Patent
Karimi-Cherkandi et al.

(10) Patent No.: US 10,069,965 B2
(45) Date of Patent: *Sep. 4, 2018

(54) MAINTAINING AUDIO COMMUNICATION IN A CONGESTED COMMUNICATION CHANNEL

(71) Applicant: Unify GmbH & Co. KG, Munich (DE)

(72) Inventors: Bizhan Karimi-Cherkandi, Boca Raton, FL (US); Farrokh Mohammadzadeh Kouchri, Boca Raton, FL (US); Schah Walli Ali, Boca Raton, FL (US)

(73) Assignee: Unify GmbH & Co. KG, Munich (DE)

( * ) Notice: Subject to any disclaimer, the term of this patent is extended or adjusted under 35 U.S.C. 154(b) by 0 days.

This patent is subject to a terminal disclaimer.

(21) Appl. No.: 15/622,523

(22) Filed: Jun. 14, 2017

(65) Prior Publication Data

US 2017/0279959 A1 Sep. 28, 2017

Related U.S. Application Data

(63) Continuation of application No. 14/911,521, filed as application No. PCT/US2013/057261 on Aug. 29, 2013, now Pat. No. 9,712,666.

(51) Int. Cl.
*H04M 3/22* (2006.01)
*H04L 12/26* (2006.01)
(Continued)

(52) U.S. Cl.
CPC .......... *H04M 3/2236* (2013.01); *G10L 15/26* (2013.01); *G10L 25/69* (2013.01); *H04L 5/006* (2013.01);
(Continued)

(58) Field of Classification Search
CPC .......... G10L 15/26; G10L 15/22; G10L 13/04; G10L 15/005; G10L 25/69; G10L 13/043; H04W 4/16; H04W 4/18
See application file for complete search history.

(56) References Cited

U.S. PATENT DOCUMENTS 5,805,771 A 9/1998 Muthusamy et al.
6,278,688 B1 8/2001 Suutari
(Continued)

FOREIGN PATENT DOCUMENTS

CN 1750503 A 3/2006
CN 1764190 A 4/2006
(Continued)

OTHER PUBLICATIONS

Office Action for Russian Patent Application No. 2016111281/08(017791) (English Translation).
(Continued)

*Primary Examiner* — Liton Miah
(74) *Attorney, Agent, or Firm* — Buchanan Ingersoll & Rooney PC

(57) ABSTRACT

The invention relates to a communication system and a method of maintaining audio communication in a congested communication channel currently bearing the transmission of speech in audio communication between a sender side and a receiver side, the communication channel having at least one signaling channel and at least one payload channel having a quality of service. During the audio communication the quality of service of the payload channel is monitored. If the quality of service of the payload channel is below a threshold the speech at the respective sender side is converted to text; and transmitted over the retained communication channel to the respective receiver side. The text may be converted back to speech at the receiver side.

20 Claims, 2 Drawing Sheets

(51) Int. Cl.
- *H04L 5/00* (2006.01)
- *H04Q 11/04* (2006.01)
- *G10L 15/26* (2006.01)
- *G10L 25/69* (2013.01)
- *H04Q 3/00* (2006.01)
- *G10L 13/04* (2013.01)
- *G10L 15/00* (2013.01)

(52) U.S. Cl.
CPC ......... *H04L 43/16* (2013.01); *H04M 3/2227* (2013.01); *H04Q 3/0091* (2013.01); *H04Q 11/0428* (2013.01); *G10L 13/04* (2013.01); *G10L 15/005* (2013.01); *H04L 43/0829* (2013.01); *H04L 43/0847* (2013.01); *H04L 43/0852* (2013.01); *H04M 2201/18* (2013.01); *H04M 2201/39* (2013.01); *H04M 2201/40* (2013.01); *H04Q 2213/13388* (2013.01)

(56) References Cited

U.S. PATENT DOCUMENTS

| | | |
|---|---|---|
| 7,080,248 B1 | 7/2006 | Liebert et al. |
| 7,617,106 B2 | 11/2009 | Schramm |
| 7,697,551 B2 | 4/2010 | Stephen et al. |
| 2002/0123892 A1 | 9/2002 | Woodward |
| 2004/0192396 A1 | 9/2004 | Fournier |
| 2005/0049868 A1 | 3/2005 | Busayapongchai |
| 2006/0235692 A1 | 10/2006 | Mukhtar et al. |
| 2008/0059200 A1 | 3/2008 | Puli |
| 2009/0110158 A1 | 4/2009 | Chen et al. |
| 2009/0234651 A1 | 7/2009 | Basir et al. |
| 2010/0106802 A1 | 4/2010 | Zink et al. |
| 2013/0177143 A1 | 7/2013 | Zhou et al. |
| 2013/0304457 A1 | 11/2013 | Kang et al. |
| 2014/0278402 A1 | 9/2014 | Charugundla |

FOREIGN PATENT DOCUMENTS

| | | |
|---|---|---|
| CN | 201440733 U | 4/2010 |
| CN | 102710539 A | 10/2012 |
| JP | 2004194132 A | 7/2004 |
| JP | 2006005440 A | 1/2006 |
| JP | 2008506303 A | 2/2008 |
| JP | 200885838 | 4/2008 |
| JP | 2009164841 | 7/2009 |
| JP | 201295260 | 5/2012 |
| KR | 20060034337 A | 4/2006 |
| KR | 20100072086 A | 6/2010 |
| RU | 2009130672 A | 3/2011 |
| TW | 200539668 A | 12/2005 |
| TW | 298593 B | 7/2008 |
| WO | 2009052000 A1 | 4/2009 |
| WO | 2009111884 A1 | 9/2009 |

OTHER PUBLICATIONS

Search Report for Russian Patent Application No. 2016111281/08(017791) (English Translation).
Office Action for Japanese Patent Application No. 2016-538902 dated May 29, 2017 (English Translation).
International Search Report for PCT/US2013/057261 dated Apr. 29, 2014.
Written Opinion of the International Searching Authority for PCT/US2013/057261 dated Apr. 29, 2014.

MAINTAINING AUDIO COMMUNICATION IN A CONGESTED COMMUNICATION CHANNEL

CROSS-REFERENCE TO RELATED APPLICATIONS

The present application is a continuation application of U.S. patent application Ser. No. 14/911,521, which is the United States national phase under 35 U.S.C. § 371 of International Patent Application No. PCT/US2013/057261. The entirety of International Patent Application No. PCT/US2013/057261 is incorporated by reference herein.

The present invention relates to a method of maintaining audio communication in a congested communication channel, a computer program for carrying out such a method, a non-transitory computer-readable medium having an application stored thereon for carrying out the method, and a communication system adapted for carrying out the method.

BACKGROUND OF THE INVENTION

Users often encounter problems with the transmission of data, such as in particular speech data, which are raised by network problems such as a high bit error rate (BER) or packet losses. These problems occur particularly often in wireless audio communication. As a result, the quality of communication may drop and become drastically poor. If these errors result from problems with the whole network and not just from one particular communication channel, even a redial will not help to establish a call with better quality. The call may be important, however, such as for instance in an emergency call.

Consequently, telecommunication providers should offer a good solution to save the audio communication even in case of severe network problems.

Saving the communication with the negotiated and established codecs and/or bearer channels may not be possible due to poor bandwidth, high packet delay, too many packet losses or high BER.

According to U.S. Pat. No. 7,617,106 B2, in order to check a correct speech-to-text (STT) conversion, the converted text is converted into speech again. Both, the original speech and the speech created from the text representation are then reproduced via a stereo headset. It is easy for a proof-reader (who in this case is a proof-listener) to find differences between the original and converted speech. U.S. Pat. No. 7,697,551 B2 teaches to interconnect telephone and instant messaging (IM) via a system. This system converts IM text into speech and then speech back into IM text. US 2002/123892 A1 discloses an embedded system for converting speech into text, which is presented on an interface to the user. In case of an error, the user provides a misrecognition error indication to the system. In turn of this, the audio input along with a reference to the active language model is forwarded to a training process. According to CN 201440733 U a sign language image is captured by a camera of a mobile communication device. A picture track is built from the images and converted into a vague text information. This text is further refined by a grammar and word combination parameters. JP 2006005440 A teaches that in case of being in a noisy environment, the camera of a mobile phone takes pictures of the lip movements and transmits them. At the receiver side, these pictures are displayed as moving pictures. As an alternative, just lip movement parameters are transmitted. According to US 2005/049868 A1, words or phrases are passed to a text-to-speech application. The created speech is then passed to one or more speech-to-text engines. A confidence level is assigned to the derived words or phrases.

The problem mentioned above may be solved by a method according to claim 1. Advantageous embodiments of the invention are subject-matter of the dependent claims.

According to the invention, the method of maintaining audio communication in a congested communication channel currently bearing the transmission of speech in the audio communication between a sender side and a receiver side, wherein the communication channel comprises at least one signaling channel and at least one payload channel having a (variable) quality of service, comprises the following steps: the quality of service of the payload channel is monitored, the sending of speech from the sender side over the payload channel is interrupted while at the same time at least the signaling channel of the communication channel is retained in case the quality of service of the payload channel is below a specified threshold. In other words, the method provides that the sending of audio data is stopped without dropping the communication channel, i.e. while maintaining at least the signaling portion of the communication channel. It goes without saying that this interruption of the sending of speech data (also briefly called "speech") may be carried out maintaining the "complete" communication channel, i.e. also the payload channel thereof. Instead of transmitting the speech from the sender to the receiver side, the speech is converted to text and sent as text data to the receiver side. Unless otherwise instructed by a user or by the control center of the communication method, the speech produced on the receiver side will be converted to text and sent to the (former) sender side which is now the receiver side. In other words, after the switch-over to transmitting only text data, the speech at the respective sender side is converted to text and transmitted to the respective receiver side.

As explained, by using the method of the invention, a call can be saved even under condition of poor quality of service.

According to one aspect of the invention, the transmission of the text data occurs over the payload channel.

The present invention is based on the reasoning that the bandwidth of a congested communication channel may still be sufficient to communicate/transmit the necessary information as text data and to avoid audio streaming in order to be able to use a channel with a low quality of service or bandwidth. The quality of service can be sensed by existing matrix in all types of communications. The quality of a service of a voice stream in a payload channel or a real-time transport protocol (RTP) channel may be detected inter alia as follows:

1) RTP packets (which are transported in IP UDP (User Datagram Protocol) packets) in a stream are sequentially numerated. Packet loss can be easily detected when one or more packets is/are missing. Packets which are out of sequence can also be detected. This may happen when IP packets take different routes to the destination.

2) Packets with a bit error are indicative of bad packets. Although the RTP stream may not have a bit error detect mechanism, but some encodings, RTP payloads have a possibility to detect bit errors (according to RFC 4867). In this context, codecs like G.722 and AMR-type of codec may be used.

3) Packet delay and jitter buffer set up in receivers can be used to detect poor transmission quality as well. Based on defined/used codec, the RTP packet interval is determined. Since packets delay over the period of transmission, usually a dedicated buffer is used to buffer few packets and smooth out the jitter arrivals. This buffer causes the delayed play out of the stream. Since the person on the receiver side does not see a transmitter, up to a certain amount of delay (also called "a lag") is tolerated. The size of this buffer is, however, finite and when the arrival of packets is delayed beyond the buffer size, then pauses in speech will be recognized by the receiver side. A jitter buffer underrun can also be an indication of bad voice quality (quality of service).

4) Analyzing the audio after stream reconstruction can also be used to detect bad audio quality. Based on abrupt audio changes it is possible to detect irregularities.

It may be advantageous for the respective receiver if the method of the invention comprises a step of converting the received text back to speech. In this case, the users involved in a telephone call or audio communication may continue their communication on an aural basis and are not forced to read the transmitted texts which were previously converted from speech to text. It is of course possible that the respective users at their end may force the system to continue to display the text transmitted by the communication channel instead of getting that text re-converted to speech.

In case the quality of service of the payload channel is continuously monitored it may be advantageous to switch back to transmit speech over the retained payload channel as soon as a sufficient quality of service has been detected in order to re-establish a "normal" audio communication or telephone call.

It may be advantageous that an alarm message is sent to the respective receiver side, as soon as the sending of speech is interrupted and text data resulting from the speech-to-text conversion is transmitted instead. This may help the respective receiver to be better prepared for the imminent change of the current communication.

In case the current audio communication is being encrypted using a certain key and a specific algorithm, it is advantageous to use the same key and the same algorithm for encrypting also the transmitted text. In this manner, the character of the secure connection may be maintained although a change to a transmission of only text data has occurred.

According to one aspect of the present invention, only the signaling channel may be used for transmitting text. Thereby, it is possible to drop the payload channel of the current communication channel, e.g. in a case where the quality of service (transmission quality) becomes too low, or in order to save the charges for using the payload channel. In this instance, the data may be in any format such as RAW, XML or other formats. The communication partners should be signaled, however, that other data will be arriving instead of those previously agreed/negotiated and which type and format of text will arrive.

According to a further aspect of the invention, a step of detecting the language of the speech may be included in order to convert the speech into text of the appropriate language. Since the technology of speech-to-text is quite advanced, this solution may be well used for the present invention. In case the STT cannot detect the language, the language to be used should be indicated from the setup of the communication device at that end of the current communication at which the change to transmission of text instead of speech has been initiated.

In order to improve the handling, it is advantageous when the imminent change from speech transmission to text transmission by the party which is the sender at that time is negotiated with the other involved party, e.g. the receiver at that point in time. While negotiating the switch-over to text, the sender may also indicate which default language is being used for the text transmission.

Some STT and TTS (text-to-speech) solutions allow the users to determine further parameters such as category of voice type and a pre-defined voice character which is to be used in TTS at the receiver side. The sender for instance may indicate in its text payload that the language is US English and "voice=Mike". Some prior art TTS solutions use these pre-defined voice characters like Mike (for male persons) or Mary (for female persons). The receiver may accept such a choice or overrule by making an own choice or by using a default value.

In order to ease the text-to-speech process on the receiver side, it may be advantageous to use a step of converting the speech at the respective sender side to a phonetic type of text.

According to a further aspect of the present invention, users may on-demand force the telecommunication system to switch over from speech transmission to text transmission by inputting a respective command. A user may for instance want to use a voice other than his or her own voice for a specific communication. Another example is the reduction of disturbing noise in the background that may be obtained by switching over to a text transmission. This works well in case the communication device is sufficiently advanced to recognize the respective user's voice and optimally convert it to text, whereupon the output will increase the clarity on the receiver side.

The problem mentioned above is solved also by a non-transitory computer-readable medium on which a respective application is stored which is able to carry out the method as described above. It goes without saying that the application has to be designed such that it may be executed on a processor of a respective communication device.

The above problem is also solved by a computer program or computer program product, for a processor of a communication device, the program being designed for carrying out a method as described above.

According to a further aspect of the present invention, the above problem may also be solved by a communication system which comprises a first communication device, a second communication device, at least one communication channel for connecting the first communication device with the second communication device and a processor for controlling the communication between the first communication device and the second communication device in a manner that a method as described above can be carried out. The first and the second communication device may be e. g. a desktop telephone, a PDA, a smart phone or a computer equipped with a microphone and connected to a telephone network.

It goes without saying that the communication system according to the present invention may comprise any of the features as described in connection with the method of the invention, and that any advantage or particularity as described above with respect to the method may be present in the system as well.

It may be advantageous that the communication system further comprises language detecting means for detecting the language of the speech and converting it to text in the appropriate language. The languages used by the two users at the sender side and the receiver side may not necessarily be the same, so that for example each user may use his/her own mother language which will then be transformed in the respective text of the same language.

In case there is no language negotiation, the party at the receiver side may ignore the message in case it cannot interpret the indicated language from the sender side. Furthermore, one user may notice the lack of proper communication—which may result in silence. In this case the respective user may continue the communication/call, terminate the call or just communicate the communication problem to the other side by speaking out this fact into the microphone.

If the user at the receiver side cannot handle the TTS in general or in the current format, the respective user can ignore this fact or try to communicate the problem to the other side.

As indicated above, the switch-over to transmission of text instead of speech occurs upon sensing that the quality of service is insufficient to maintain the audio communication without alteration.

Advantageous embodiments of the present invention are shown in the drawing in an exemplary manner which is not to be construed in a restrictive way.

DESCRIPTION OF THE PREFERRED EMBODIMENTS

Figure 1:
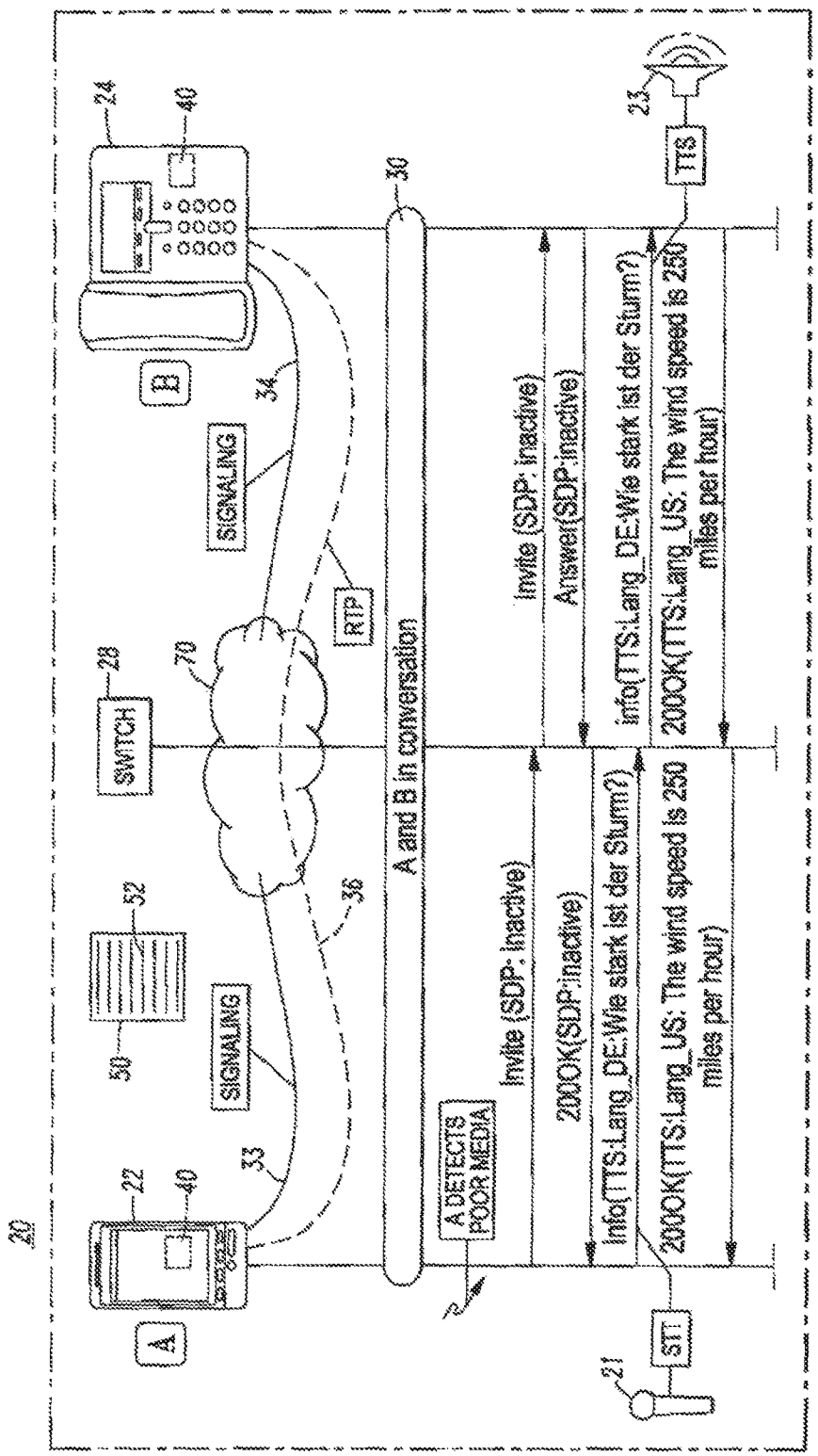
FIG. 1 depicts one possible embodiment of a communication system according to the invention in which a first embodiment of the method of the present invention may be carried out.

As can be seen in FIG. 1, a communication system 20 according to the invention comprises a first communication device A, a second communication device B, and a communication network 10 by which the two communication devices A, B may be connected with each other. The communication network 10 may be a PSTN (public switched telephone network), a network for mobile communication or any other appropriate network. As one component of the telecommunication network 10, a switch 28 is displayed. As the first and the second communication device A, B, mobile phones, smart phones, desktop telephones or similar devices may be used. As an example, two signaling lines or channels 33 and 34 are shown, with which the two communication devices A and B, respectively, can establish a communication with each other. Such a communication can be set up with a payload channel 36, which may also be called RTP channel or bearer channel.

The method of the present invention may be implemented by a specific computer program 52 or computer program product which may cause a processor 40 to carry out the method of the invention. The processor 40 is depicted to be provided in the first and the second communication devices A and B. Optionally, it may e.g. be provided in the switch 28 or in a control center (not shown) instead. In other words, the method of the invention is computer-implemented. Alternatively, the method may be implemented by hardware as well. The computer program 52 is symbolically depicted as stored on the computer-readable medium 50 which may be a memory stick, a memory card, an SSD drive or an "ordinary" hard drive, which are only examples for such a non-transitory computer-readable medium.

For the description of the method of the present invention, it may be assumed that a conversation between the first communication device A and the second communication device B has been established using a communication channel 30 which comprises a signaling channel 33, 34 and a payload channel 36. At a certain point in time, the first communication device A detects that the quality of service in the payload channel 26 of the communication channel 30 has become so poor that it is not sufficient to maintain the audio communication without performing an alteration.

For the purpose of the description of the method of the present invention, at first the first communication device A forms the sender side 22 of the communication, and the second communication device B forms the receiver side 24 of the communication.

The method of the invention is described using the SIP (session initiation protocol). It goes without saying that any other communication protocol may be used instead and that the invention is not restricted to the use of SIP. Given this situation, the first communication device A sends an invite message via the signaling line 33 to the switch 28. In this invite message, the session description protocol (SDP) is defined to be inactive. Then, the switch 28 sends an invite message to the second communication device B with SDP defined to be inactive. The second communication device B sends back an answer message to the switch 28 with SDP still inactive. The switch 28 sends a so-called message 200OK with SDP still inactive back to the first communication device A. The first communication device A carries out a speech-to-text (STT) conversion of the speech data recorded with the microphone 21 associated with the first communication device A. As an example, the German sentence "Wie stark ist der Sturm?" is placed in the signaling line 33 as a text information, together with the indication of German to be the language used by the system. The same message is placed by the switch 28 into a signaling line 34 and sent to the second communication device B. After reception at the receiving side 24 (second communication device B), a text-to-speech (TTS) conversion of this message is carried out, and the result is output via a loudspeaker 23 associated with the second communication device B. The user using the second communication device B may answer the question by speaking into his/her own microphone (not shown): "The wind speed is 250 miles per hour". This speech data from the second communication device B which is now the sender 22 side is STT converted, and the data are placed in a message 200OK (together with the indication that the language is US English) and sent to the switch 28. The switch 28 passes this message to the first communication device A which is now the receiver side 24, where the message is TTS converted and output via a loudspeaker (not shown).

This manner of communication may be continued as long as desired or necessary, or up to the end of the respective communication. It is to be noted that there is no language negotiation here. If the receiver side 24 cannot interpret the indicated language from the sender side 22, then the receiver side 24 can or should ignore the respective messages. The user at the receiver side 24 may notice the lack of proper communication (e.g. by hearing only silence) and it is up to the user to continue or terminate the call. The same applies to the user at the sender side 22.

Figure 2:
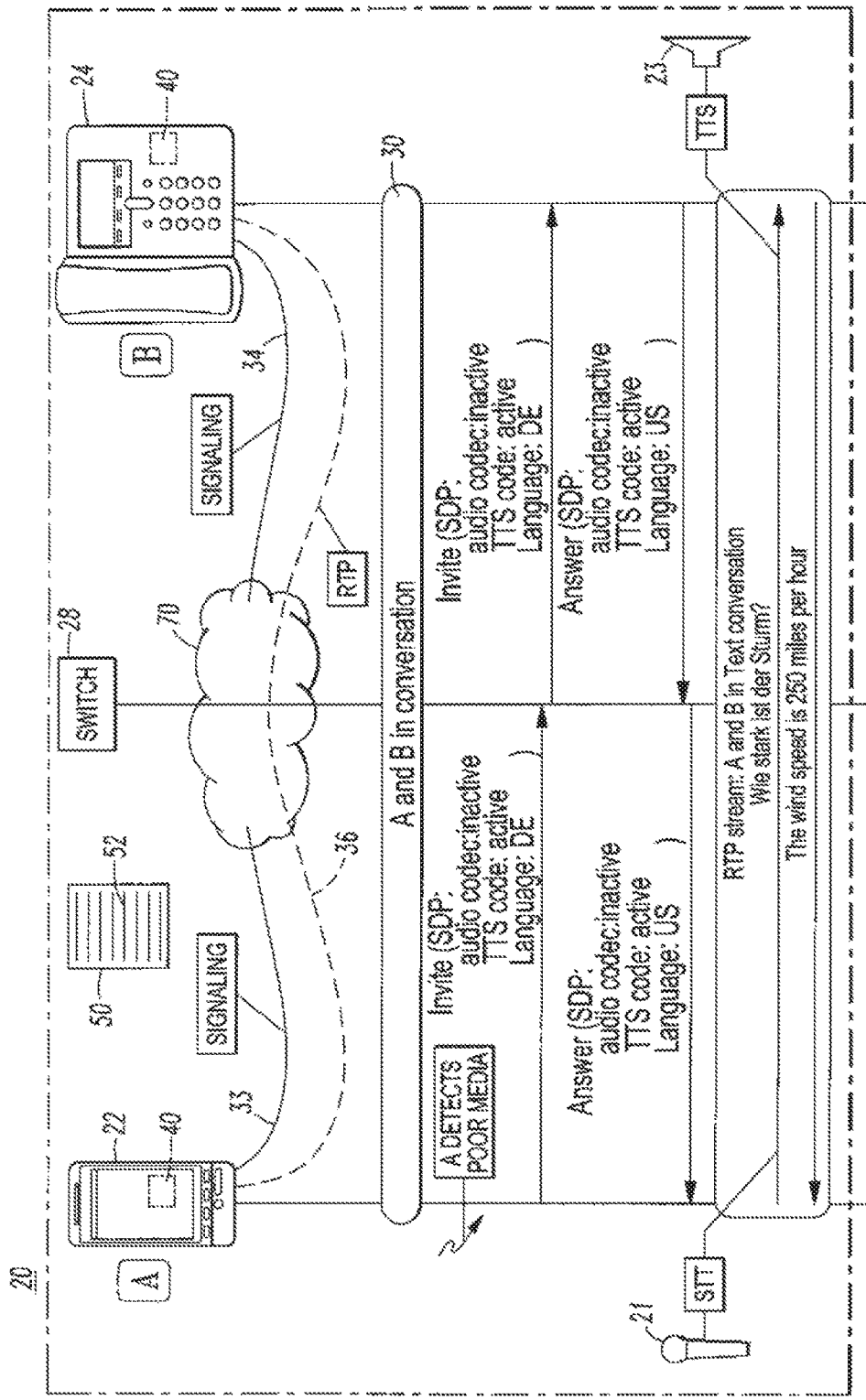
FIG. 2 depicts the same communication system as in FIG. 1 and shows how a second embodiment of the method of the present invention may be carried out.

In FIG. 2 the same setting of the communication system 20 is shown as in FIG. 1. As can be seen in FIG. 2, however, the method carried out differs from that shown in FIG. 1. While according to FIG. 1 the data (speech data STT converted to text data) is placed into the signaling channel 33, 34, according to FIG. 2 the payload channel 36 is used instead. Upon sensing the inacceptable quality of service in the communication channel 30, the first communication device A sends an invite message to the switch 28 with the specification: SDP: audio codec: inactive, TTS code: active, language: DE. The same message is passed over by the switch 28 to the second communication device B. The second communication device B answers by sending an answer message with the specification: SDP: audio codec: inactive, TTS code: active, language: US. This means that the second communication device B which is now the sender side 22 is going to use US English as the language. Upon receipt of the answer message, the switch 28 sends a message 200OK with the same specification to the first communication device A. In this manner, the two communication devices A, B have negotiated the use of text data converted from speech data and the use of German and US English for the two communication devices 22 and 24, respectively. Thereafter, on the payload channel 36 an RTP stream may be transmitted back and forth, e. g. with the question "Wie stark ist der Sturm?" and the answer "The wind speed is 250 miles per hour." as known from the description above. As already described, the respective text data will then be TTS converted at the respective receiver sides and output on appropriate loudspeakers.

In the above method, a new payload type in RTP may be defined. A list of examples of payload types can be found in:
http://en.wikipedia.org/wiki/Packet_loss
http://ieeexplore.ieee.org/xpl/login.jsp?tp=&arnumber=1559904&url=http%3A%2F%2Fieeexplore.ieee.org%2Fxpls%2Fabs_all.jsp%3Farnumber%3D1559904
http://vonage nmhoy.net/packetloss.html
http://pe.org.pl/articles/2011/10/78.pdf
http://voip.netlab.uky.edu/~fei/teaching/cs671/slides/rtp.pdf If the negotiation is embedded in a protocol, the standard procedures of renegotiation foreseen in the protocol may apply. According to one aspect of the invention, the payload channel 36 may be continuously monitored in order to detect whether the quality of service has reached again an acceptable level in order to switch back to a normal speech communication instead of the text communication.

As can be seen from the above description, the conversion from text to speech may be optional The user may in other words set up his device to suppress the conversion from text to speech.

A further aspect of the present invention is that the switch-over to a transmission of text data can also be invoked on-demand by a user. For example, a user may want to use a voice other than his or her own voice, or the background noise may be disturbing the conversation. In the latter case, if the communication device is sufficiently advanced to recognize the user's voice and optimally convert it to text, the TTS converted output will increase the clarity on the respective receiver side since the noise has been cancelled.

While the invention has been described with respect to a limited number of embodiments, these should not be construed as limitations on the scope of the invention, but rather as examples of some of the conceivable embodiments. Those skilled in the art may envision other possible variations, modifications and implementations that are also within the scope of the present invention. It should be understood that some individual features of various embodiments may be combined in different ways than shown, with one another. This regards for example the kind of devices used in the communication system or the kind of messages used for carrying out the method.

On the other hand, it should be apparent to one skilled in the art that the invention may be practiced without some of the specific details presented herein. Furthermore, some well-known steps or components may be described only generally or even omitted, for the sake of illustrative clarity.

The method and communication system according to the present invention may refer and may be used in ISDN and VoIP or any other appropriate environment without being limited thereto.

The invention claimed is:

1. A method of maintaining audio communication in a communication channel for transmission of speech in the audio communication between a sender side and a receiver side, the communication channel comprising at least a first channel and a second channel, the first channel being utilizable for transmission of speech, the method comprising:
    monitoring a quality of service of the first channel;
    upon determining that the quality of service of the first channel is below a pre-selected threshold:
        interrupting the sending of speech data of the speech from the sender side over the first channel while retaining the second channel of the communication channel, and
        indicating that the first channel is inactive and that the retained second channel is to be used for continuing the audio communication via the retained second channel;
    converting speech to text at the sender side for transmitting the text to the receiver side via the retained second channel; and
    transmitting the text over the retained second channel of the communication channel for conversion of the text to speech at the receiver side.

2. The method of claim 1, further comprising:
    converting the received text to speech at the receiver side based on a language identifier sent via the second channel that is included with the text transmitted via the second channel.

3. The method of claim 1, wherein the second channel is a signaling channel and the first channel is a payload channel.

4. The method of claim 1, wherein the first channel is retained after the first channel is inactivated, the method further comprising:
    resuming the transmission of speech over the first channel after the quality of service has been detected as being at or above the pre-selected threshold.

5. The method of claim 1, further comprising sending an alarm message to the receiver side upon interrupting the sending of speech from the sender side.

6. The method of claim 1, wherein the audio communication is encrypted using a key and a specific algorithm, the method further comprising encrypting the text with the key and the specific algorithm.

7. The method of claim 1, wherein the second channel is only used for transmitting the text.

8. The method of claim 1, further comprising detecting the language of the speech and converting it to text in the detected language.

9. The method of claim 1, wherein the second channel is a channel by which invite and answer signaling messages are transmitted for establishing the communication channel and at least one payload channel, the method comprising:
    exchanging messages between the sender side and the receiver side via the second channel to indicate the payload channel is inactive and the second channel is to be used for continuing the audio communication via the second channel in which:
        the sender side sending a first invite message to a switch via the signaling channel;

the switch sending a second invite message to the receiver side based on the first invited message after receiving the first invite message;

the receiver side sending a first answer message to the switch in response to the second invite message; and the switch sending a second answer message to the sender side based on the first answer message after receiving the first answer message.

10. The method of claim 1, wherein the text of the converted speech is a phonetic type of text.

11. The method of claim 1, further comprising accepting a user input to perform interrupting of the sending of speech, converting the speech to text, and transmitting the text.

12. The method of claim 1, wherein the receiver side is a communication terminal, a mobile phone, a telephone, or a desktop telephone; and wherein the sender side is a communication terminal, a mobile phone, a telephone, or a desktop telephone; and wherein a switch device or a control center that communicatively connects the receiver side to the sender side performs at least some steps of the method.

13. A non-transitory computer readable medium having an application stored thereon, the application defining instructions executable by a processor of a communication device for carrying out a method when the application is run by the processor, the method comprising:

monitoring a quality of service of a first channel of a communication channel between a sender side and a receiver side;

upon determining that the quality of service of the first channel is below a pre-selected threshold:

interrupting the sending of speech data of the speech from the sender side over the first channel while retaining a second channel of the communication channel, and indicating that the first channel is inactive and that the retained second channel is to be used for continuing the audio communication via the retained second channel;

converting speech to text for transmitting the text to the receiver side via the retained second channel; and transmitting the text over the retained second channel of the communication channel for conversion of the text to speech at the receiver side.

14. The non-transitory computer readable medium of claim 13, wherein the second channel is a signaling channel and the first channel is a payload channel.

15. The non-transitory computer readable medium of claim 13, wherein the communication device is a switch, a communication terminal, a mobile phone, a telephone, or a desktop telephone.

16. A communication apparatus, comprising:

a processor configured to control communication between a first communication device and a second communication device, the processor configured to carry out a method comprising:

monitoring a quality of service of a first channel of a communication connection between the first and second communication devices;

upon determining that the quality of service of the first channel is below a pre-selected threshold:

interrupting the sending of speech data of the speech from the first communication device over the first channel while retaining a second channel of the communication channel, and indicating that the first channel is inactive and that the retained second channel is to be used for continuing the audio communication via the retained second channel;

converting speech to text at the first communication device for transmitting the text to the second communication device via the retained second channel; and transmitting the text over the retained second channel of the communication channel for conversion of the text to speech at the second communication device.

17. The communication apparatus of claim 16, wherein at least one of the first communication device and the second communication device comprises a language detecting mechanism that is configured to detect the language of the speech and convert that speech to text in an appropriate language.

18. The communication system of claim 16, wherein the processor is a processor of the first communication device, a processor of the second communication device, or a processor of a switch that facilitates the communication connection between the first and second communication devices.

19. The communication apparatus of claim 18, comprising the first and second communication devices.

20. The communication apparatus of claim 16, wherein the processor is connected to non-transitory memory having a program stored thereon that defines the method, the processor connected to the non-transitory memory such that the program is executable by the processor.

* * * * *